US012754908B2

(12) United States Patent
Freund et al.

(10) Patent No.: US 12,754,908 B2
(45) Date of Patent: Oct. 6, 2026

(54) TRUSTWORTHY FRAMEWORK FOR QUALITY ASSESSMENT AND ALIGNMENT OF GENERATIVE PROCESSES

(71) Applicant: Dell Products L.P., Round Rock, TX (US)

(72) Inventors: Werner Spolidoro Freund, Rio de Janeiro (BR); Marcus Vinicius Libardi Pazini, Caxias do Sul (BR); Herberth Birck Fröhlich, Florianópolis (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/034,310

(22) Filed: Jan. 22, 2025

(65) Prior Publication Data

US 2026/0211876 A1 Jul. 23, 2026

(51) Int. Cl.

| | |
|---|---|
| ***G06F 16/2452*** | (2019.01) |
| ***G06N 3/042*** | (2023.01) |
| ***G06N 3/0475*** | (2023.01) |
| ***G06N 3/096*** | (2023.01) |

(52) U.S. Cl.

CPC ....... *G06F 16/24522* (2019.01); *G06N 3/042* (2023.01); *G06N 3/0475* (2023.01); *G06N 3/096* (2023.01)

(58) Field of Classification Search

CPC .... G06F 16/24522; G06N 3/02; G06N 3/096; G06N 3/08; G06N 3/0475; G06N 3/04; G06N 3/047

See application file for complete search history.

(56) References Cited

U.S. PATENT DOCUMENTS

| | | | | |
|---|---|---|---|---|
| 7,478,077 | B2 * | 1/2009 | Berger | G06F 21/552 |
| 12,314,739 | B1 * | 5/2025 | Browder | G06F 9/542 |
| 2006/0271507 | A1 * | 11/2006 | Anzalone | G06F 16/00 |
| 2017/0032477 | A1 * | 2/2017 | Kamen | G06F 9/5072 |
| 2024/0028188 | A1 * | 1/2024 | Murakawa | G06F 8/34 |
| 2024/0411982 | A1 * | 12/2024 | Malanga | G06V 30/412 |
| 2024/0428017 | A1 * | 12/2024 | Shoham | G06F 16/243 |
| 2025/0307337 | A1 * | 10/2025 | Ozaki | G06F 40/30 |
| 2025/0312652 | A1 * | 10/2025 | Brammer | A63B 24/0059 |
| 2025/0315458 | A1 * | 10/2025 | Clancy | G06F 16/338 |

OTHER PUBLICATIONS

Lewis et al., "Retrieval-Augmented Generation for Knowledge-Intensive NLP Tasks", Facebook AI Research, University College London, New York University, Apr. 12, 2021, 19 Pages.

(Continued)

*Primary Examiner* — Vaishali Shah
(74) *Attorney, Agent, or Firm* — Workman Nydegger

(57) ABSTRACT

Techniques for testing a RAG system are disclosed. A service obtains source content and facilitates the generation of a question that is designed to test the RAG system. The service facilitates the generation of the question. The service also facilitates the generation of a set of merged excerpts identified from within the source content. Multiple RPIs (reference pattern of information) are generated for the merged excerpts. The service then facilitates the generation of a reference triplet using the question, a specific subset of RPIs, and a specific subset of merged excerpts. The service then subjects the reference triplet to a review process.

20 Claims, 15 Drawing Sheets

(56) References Cited

OTHER PUBLICATIONS

Cibils et al., "Diverse Beam Search for Increased Novelty in Abstractive Summarization", Ecole Polytechnique Federale de Lausanne (EPFL), Artificial Intelligence Group—Swisscom AG, Feb. 5, 2018, 7 Pages.
Poesia et al., "Certified Deductive Reasoning With Language Models", Stanford University, Nov. 8, 2023, 22 Pages.

* cited by examiner

TRUSTWORTHY FRAMEWORK FOR QUALITY ASSESSMENT AND ALIGNMENT OF GENERATIVE PROCESSES

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNOLOGICAL FIELD OF THE DISCLOSURE

Embodiments disclosed herein generally relate to testing a Retrieval Augmented Generation (RAG) system for a large language model (LLM). More particularly, at least some embodiments relate to systems, hardware, software, computer-readable media, and methods for improving how RAG systems are tested so as to improve the quality assessment for an LLM.

BACKGROUND

Retrieval Augmented Generation (RAG) has emerged as the de facto standard solution when developing systems that utilize Generative AI (GenAI) to break information silos and to enhance the agility of navigating enterprise-level content. In one step of the RAG process (e.g., an information retrieval step), the RAG system obtains relevant information from indexed databases for a given user input. A Large Language Model (LLM) is then responsible for leveraging user input and retrieved information as available in its prompt to provide an answer during the content generation step. RAG systems provide a way to efficiently ground LLM responses with fresh or confidential information.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION

Figure 1:
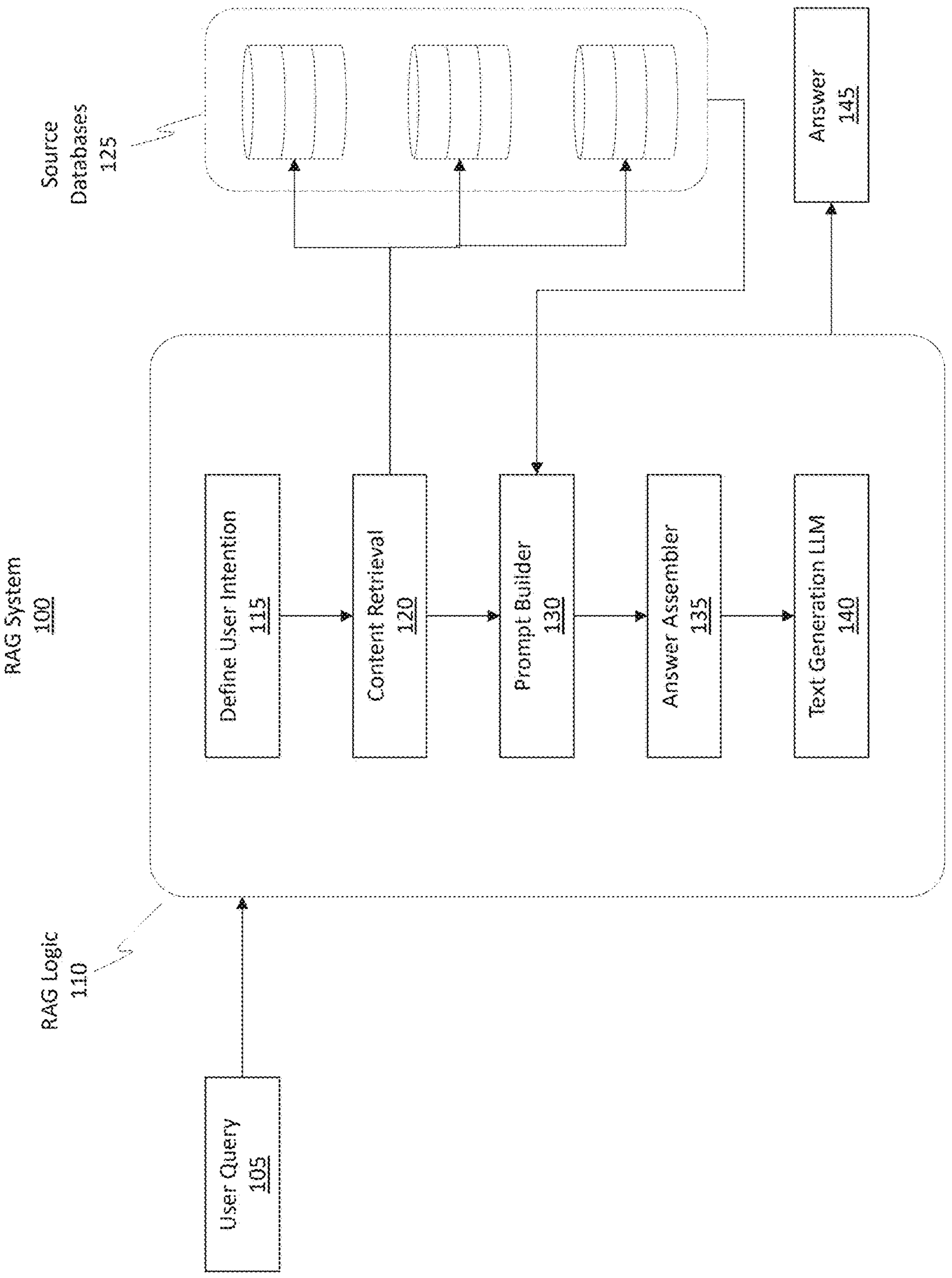
FIG. 1 illustrates an example of a RAG system.

As mentioned earlier, RAG systems obtain relevant information from indexed databases for a given user input. An LLM is then responsible for leveraging user input and retrieved information as available in its prompt to provide an answer during the content generation step. RAG systems provide a way to efficiently ground LLM responses with fresh or confidential information. FIG. 1 provides additional details regarding a RAG system.

FIG. 1 displays a RAG system 100 and its main phases or modules, ranging from receiving a user query 105 to generating an answer 145. The user query 105 is processed by the RAG logic 110.

In FIG. 1, the "Define User Intention" module 115 uses the user query 105 to model the rest of the pipeline. Often, these steps involve moderation or the customization of an instruction prompt.

The "Content Retrieval" module 120 then involves querying one, some, or all available source databases 125 that have pre-processed textual content in a chunk-like manner. These source databases 125 are normally vector databases that support a similarity search operation.

The textual content is returned at the "Prompt Builder" module 130. This module identifies the results that are determined to be most relevant with respect to the user's query. Those results will be used to generate a prompt for the LLM. Because of a limited context size dictated by the text generation LLM module 140, it is often the case that the highest ranked sources are used to build the prompt.

An answer assembler module 135 will use the prompt as input. This module requests an answer from the text generation LLM module 140, which will produce the desired response or answer 145. Additional steps, such as re-ranking or post-processing on the output of the text-generation LLM, can also be included in some renditions of the RAG system 100.

In this regard, RAG is a process by which an LLM is fed with a query and with data that contains the answer to that query. The LLM is then constrained in such a way that its answer to the query should not deviate from the content given as input. RAG was originally proposed in 2020, but lately its popularity has significantly increased and is now considered the state-of-the-art approach for achieving more reliable, up-to-date, and factual outputs from LLMs.

Current implementations of the RAG process typically break documents into chunks of raw text. These chunks populate a set of databases (e.g., the source databases 125) that are then used as sources for question-and-answering. Those chunks are transformed into a vectorial representation (referred to as an "embedding") with some language model and are stored in a vector database, which indexes them efficiently. The language model used for embedding the chunks may be the same used to answer the user queries. Typically, however, a lighter model (with fewer parameters) is employed. The chunks are stored with metadata indicating the original source document. Additionally, other metadata may be associated with the chunks, such as authorship and other characteristics, which may be stored in the vector database or elsewhere, in structured or unstructured format.

When the user submits a query to the LLM (e.g., user query 105), that query is first embedded with the same language model used to embed the document chunks. The embedded query is then used to search the most similar chunks in the vector database, using the embedded chunk vectors. Similarly, the vector space is typically computed with some distance function, such as the Euclidean distance, the cosine distance, etc. This process is referred to as a semantic search because the embeddings encode some semantics of the input sentences.

From the top-k most similar chunks, the associated documents (and any additional metadata) are retrieved. Those, in turn, will be used to assemble the input (also known as context or prompt, as shown by prompt builder module 130) for the LLM. Typically, the input follows a template having some natural language instruction for the LLM, the query to be answered, and the document contents to be summarized.

RAG implementations usually vary in the choice of the language model for the embeddings, the chunking strategy used for source documents, the types of metadata associated with the chunks, how the documents associated with the chunks are accessed and processed, how the LLM input is assembled, and in the choice of the LLM itself.

Quality measures are highly relevant for understanding RAG system behavior and for making informed decisions for system improvement. The disclosed embodiments focus on techniques for improving the current RAG systems. As one example, regarding the information retrieval step (e.g., content retrieval module 120 in FIG. 1), current approaches derive questions based on the "sources" in the RAG system database (e.g., source databases 125) and based on commonly composed information chunks or information segments in documents. A chunk employed to derive the question is referred to as the "reference source" and is expected to be an output of the retrieval system, thus providing an effective means to measure its retrieval efficiency. It is often desirable to continuously improve the quality measures of the information retrieved in the RAG system.

There are two main approaches to compute quality measures for the retrieved information. In a first approach, one group of systems uses the identifier of the retrieved information to check whether they match the reference source identifier. An example in this group of systems is llama-index. Another approach (e.g., followed by frameworks like RAGAS) relies on model evaluation (e.g., LLM-based or semantic-based), where efficiency measures are dedicated to evaluating alignment of the retrieved information with the reference source.

Both approaches have their limitations. For example, the first approach has a downside in that every time a modification is made in the ingestion pipeline, the dataset either must be regenerated or a mapping between the original dataset identifiers to the new identifiers must be made. Modifications in the ingestion pipeline can occur when new data representations are proposed, new models become available, or the system is ported to a new infrastructure. Considerable effort may be placed in dataset generation, especially if data curation is employed, such that generating a new dataset to replace the previous one is not a best practice.

The second approach mitigates some of these problems because the models are more resilient to modifications in the specificities of the ingestion pipeline or of the RAG database. Those models can be employed in a way such that they are more content focused instead of relying on non-generalizable identifiers. However, this second approach overcomes the problem by introducing systematic impacts in the evaluation process. The underlying black-box mechanisms have associated limitations that are challenging to control and to measure, and they introduce unknown systematic uncertainty sources onto measurements.

Specifically, semantic comparisons of LLMs can focus on irrelevant aspects when comparing the alignment of retrieval information with reference sources. It is noted that the reference typically includes more information than is essential to answer the question. This scenario introduces additional contributions to the problem. While LLMs can be employed to remove frivolous information, it is noted that they are subject to introducing other errors in the process if not properly controlled.

In addition to the challenges presented above, challenges arise with other phases of the RAG process, such as the content generation evaluation. Some techniques have been developed in an effort to address these challenges, such as a low entropy framework for end-to-end assessment based on LLM knowledge distillation onto interpretable models that capture required information aspects for an answer to be considered correct. These models, called "Referenced Patterns of Information" (RPI), can be curated by humans with limited technical expertise, thereby providing a way to guide system improvement towards its alignment with human preferences.

To maximize RPI-based automated efficiency measurements, a squashing instruction (SQI) can optionally be appended to the question presented to the RAG system. This appending action results in a squashed question (SQT), which is responsible for reducing the entropy of valid answer distribution.

By way of additional context, general purpose examples of SQIs include "Respond with a minimal excerpt from the available context" or "Respond with a simple 'yes' or 'no'" or "Respond with a simple 'yes' or 'no' and justify with an excerpt from the available context."

Without proper control, LLM knowledge distillation is subject to requiring additional human intervention to correct ungrounded or erroneous RPIs. These limitations increase the incidence of human intervention required to achieve high quality testing data, therefore hindering the ability to achieve scalable efficiency measurements. The disclosed embodiments are directed to techniques for dealing with the problem of controlling the dataset generation process.

Additionally, the disclosed embodiments address the following challenges. One challenge relates to how to provide a way to automatically retrieve the relevant information in the reference source, where the relevant information is the information used to answer the generated question. Another challenge relates to how to control the LLM knowledge distillation process to reduce the incidence of human intervention.

The disclosed embodiments are designed to address the above problems and challenges as well as to provide numerous other benefits, advantages, and practical applications to the RAG technology. In particular, the disclosed embodiments are designed to implement a quality evaluation framework with unique aspects concerning its synthetic dataset generation capabilities. One such beneficial and unique capability relates to an excerpt filtering module. Here, automated derivation of excerpts from sources are provided just enough context to properly answer questions with corresponding RPIs. The embodiments are beneficially able to generate diverse excerpts, group them together based on their overlap, and sort them according which LLM model is most likely to be used.

Another beneficial and unique capability relates to an RPI generation module. Here, automated derivation of RPIs are designed to respect SQI requirements. Some embodiments are directed to a unique decoding algorithm structured to modify trustworthy extractive decoding (TED) by ensuring that guided decoding is always active and that it can properly label how it is using excerpt content.

Another beneficial and unique capability relates to a diverse reference generation and reference processing module. Here, automated derivation of the most likely RPIs and excerpts per SQT are provided to enhance synthetic generation efficiency. The disclosed framework automatically determines the resulting reference triplet by excerpt and RPI model likelihoods.

Another beneficial and unique capability relates to a reference selection module. Here, automated derivation of multiple RPIs and excerpts per SQT are provided to facilitate curation by simple selection of proper RPIs and excerpts. This is achieved by enhancing the modified TED algorithms with diverse beam search (DBS).

Another beneficial and unique capability relates to a partial regeneration module. Here, automated adaptation of RPIs and excerpts are provided when SQTs are refined. Also, automated adaptation of excerpts are provided when RPIs are refined. Furthermore, automated adaptation of RPIs are provided when excerpts are refined. This can be achieved because the initial triplet generation process is modularized, so that it can be partially reprocessed when a part of it is modified. The disclosed decoding algorithms also ensure that the embodiments can ensure that the resulting excerpts are compliant to modified RPIs. These modules and capabilities are beneficially designed to mitigate human curation efforts during dataset generation and to allow better retrieval automated verification due to the availability of excerpts instead of complete sources.

Figure 2A:
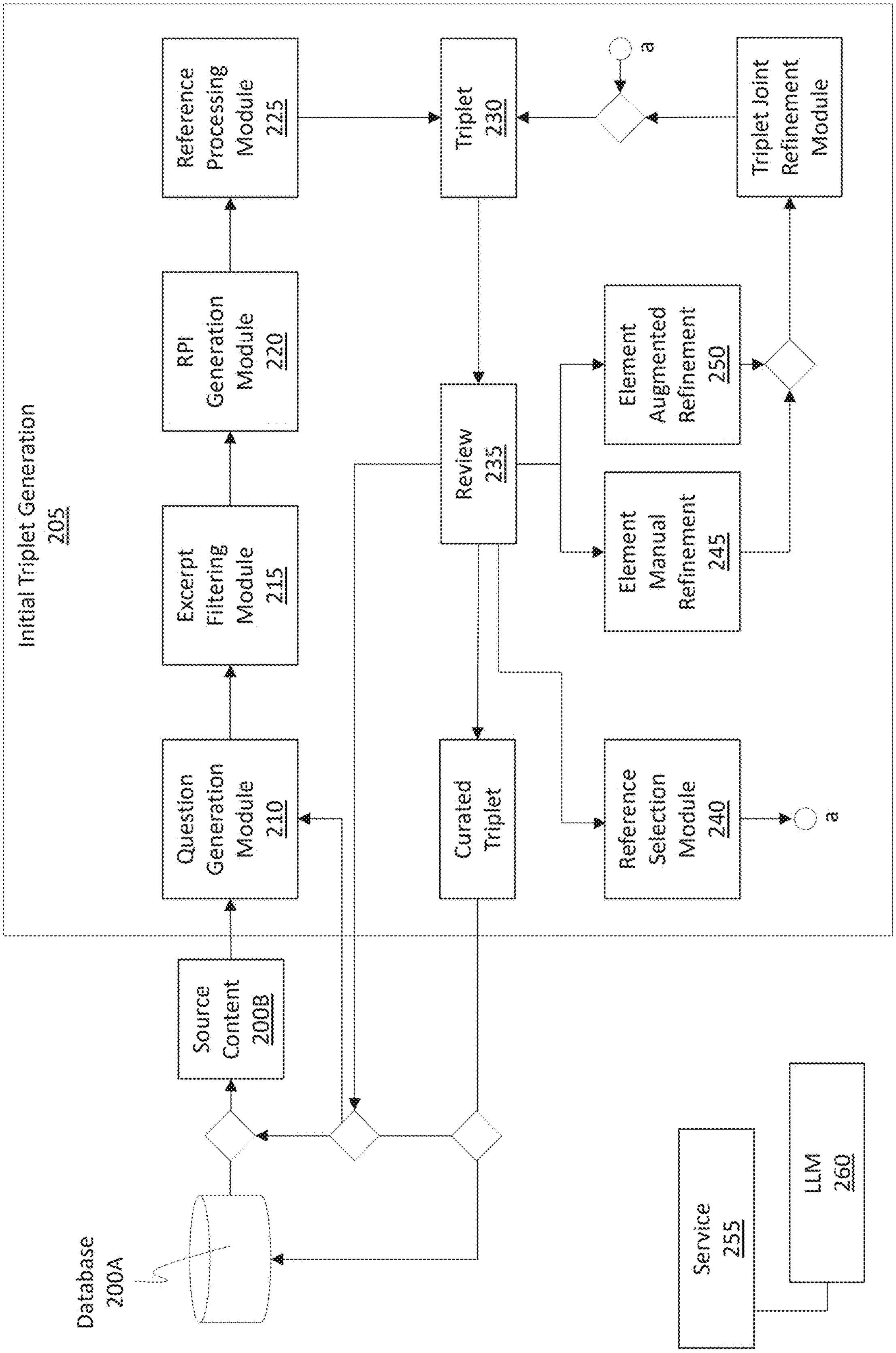
FIGS. 2A, 2B, and 2C illustrate example architectures and tests runs for testing a RAG system.

To achieve the above benefits, advantages, and practical applications, the disclosed embodiments are directed to a trustworthy quality assessment framework that provides controls during the LLM knowledge distillation process to minimize human intervention during dataset generation. FIG. 2A shows an example architecture 200 that can operate to achieve these benefits.

Service 255 in architecture 200 can help facilitate the various operations that are performed within architecture 200. That is, service 255 can operate as the orchestrator for triggering the various modules and for facilitating the workflow. As used herein, the term "service" refers to an automated program that is tasked with performing different actions based on input. In some cases, service 255 can be a deterministic classifier that operates fully given a set of inputs and without a randomization factor. In other cases, service 255 can be or can include a machine learning (ML) or artificial intelligence engine. The ML engine enables service 255 to operate even when faced with a randomization factor. The ML engine may include an LLM 260.

As used herein, reference to any type of machine learning or artificial intelligence (or large language model (LLM)) may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 255 is a local service operating on a local device, such as an edge device. In some implementations, service 255 is a cloud service operating in a cloud environment. In some implementations, service 255 is a hybrid service that includes a cloud component operating in the cloud and a local component operating on a local device. These two components can communicate with one another. As mentioned above, service 255 is tasked as the orchestrator for managing the disclosed operations.

Within a retrieval augmented generation (RAG) system (e.g., perhaps RAG system 100 of FIG. 1), service 255 performs an information retrieval operation by accessing a database 200A that is selected to provide source content 200B usable to generate a question designed to test the RAG system. The information retrieval operation further includes obtaining the source content.

The question generation module 210 receives the source content 200B and a list of previous questions that have been used or presented to the RAG system or to the LLM. The question generation module 210 is tasked with generating the question that is designed to test the RAG system. Typically, this question is designed so as to be unrelated to the previous questions.

The excerpt filtering module 215 receives the source content and the question generated by the question generation module. The excerpt filtering module 215 is tasked with generating a set of excerpt groups that are identified from within the source content. Each excerpt group in the set includes variations of possible excerpts that are fine-tunable during a review process. Also, the excerpt groups in the set are merged together to form a set of merged excerpts.

The referenced pattern of information (RPI) generation module 220 receives the question and the set of merged excerpts The RPI generation module 220 is tasked with generating a set of RPIs for each merged excerpt included in the set of merged excerpts.

The reference processing module 225 receives the set of RPIs and the set of merged excerpts. The reference processing module 225 is tasked with selecting, from the set of merged excerpts, a subset of merged excerpts and selecting, from the set of RPIs, a subset of RPIs. The subset of merged excerpts and the subset of RPIs are used to generate a reference triplet 230 comprising (i) the question, (ii) the subset of RPIs, and (iii) the subset of merged excerpts.

Service 255 then subjects the reference triplet 230 to the review process (e.g., review 235) during which the reference triplet is (i) accepted, (ii) discarded, or (iii) curated via fine-tuning.

By way of further detail, architecture 200 involves a system that operates in the following steps. First, it is noted how the dataset generation process has various modules that are executed within the initial triplet generation 205 process. This process is dedicated to reducing human intervention in the derivation of a dataset generation. Different from a low entropy framework, the generation process is modularized, as shown by the question generation module 210, the excerpt filtering module 215, the RPI generation module 220, and the reference processing module 225.

Figure 2B:
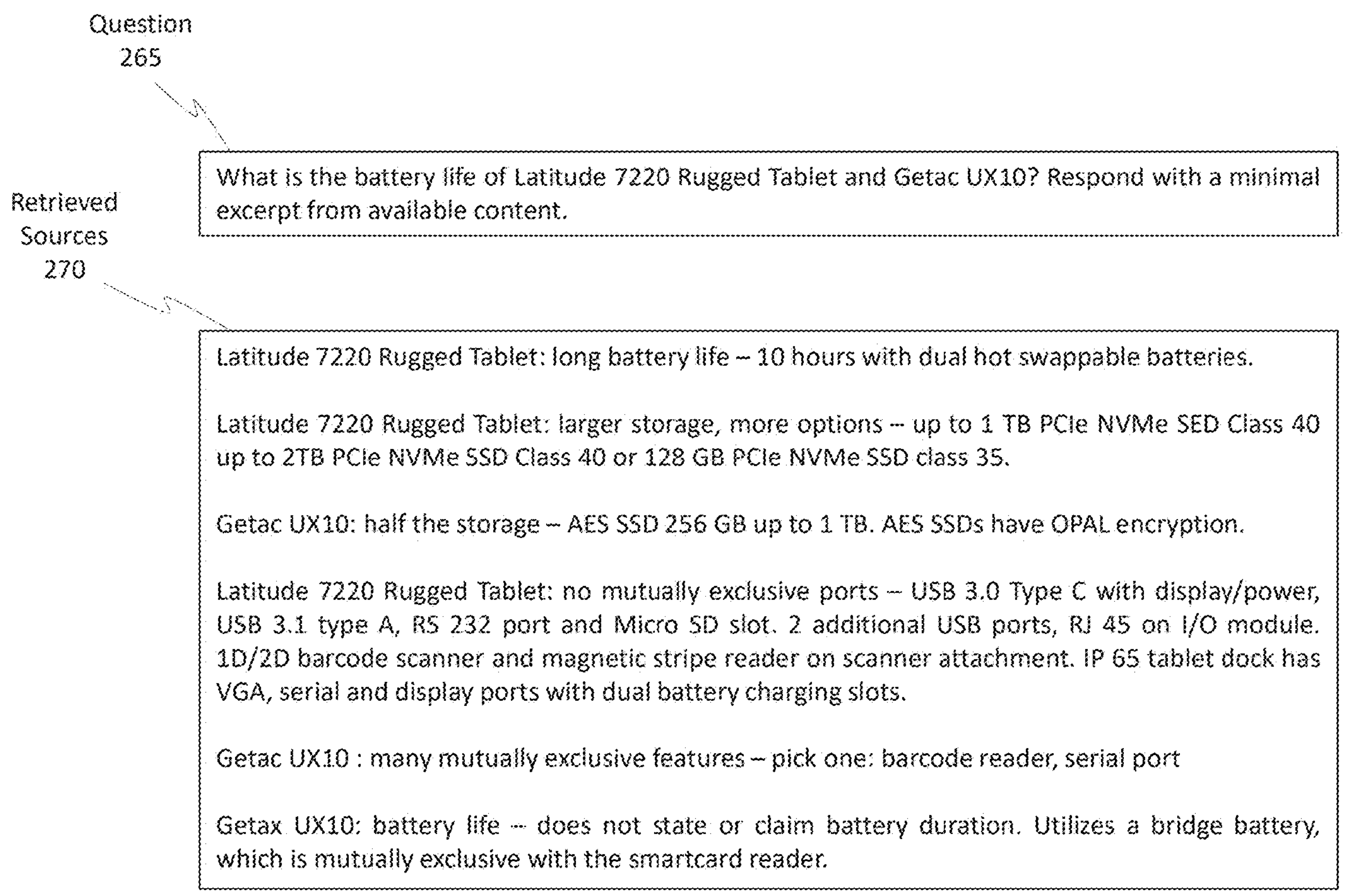

Regarding the question generation module 210, the disclosed embodiments rely on a scenario where the question is accompanied by an SQI. This stage is unrestricted in terms of the decoding algorithm and other control mechanisms. That is, any approach can be employed. For instance, FIG. 2B shows a question 265 that may be generated by the question generation module 210.

Regarding the excerpt filtering module 215 in FIG. 2A, the embodiments extract a diverse set of excerpts containing essential information to answer the question using an enhanced version of diverse beam search (DBS) and trustworthy extractive decoding (TED). These are sorted according to model per-token logits. For instance, FIG. 2B shows retrieved sources 270 (e.g., various statements or excerpts) that represent the diverse set of excerpts containing the essential information to answer the question 265.

Regarding the RPI generation module 220, the embodiments employ (in this stage) a dedicated guide tool that intervenes in the decoding process to ensure that RPIs respect requirements. For instance: "Respond with a simple 'yes' or 'no' and justify with an excerpt". Such a statement requires the generation of a yes or no string plus a set of diverse RPIs corresponding to an important aspect to be present in the justification. RPIs are sampled with another modification of DBS and TED.

Regarding the reference processing module 225, this module retrieves all diverse excerpts and RPIs for an SQT. This module also composes an initial reference triplet 230 to be provided for review 235, potentially by a human expert.

Figure 2C:
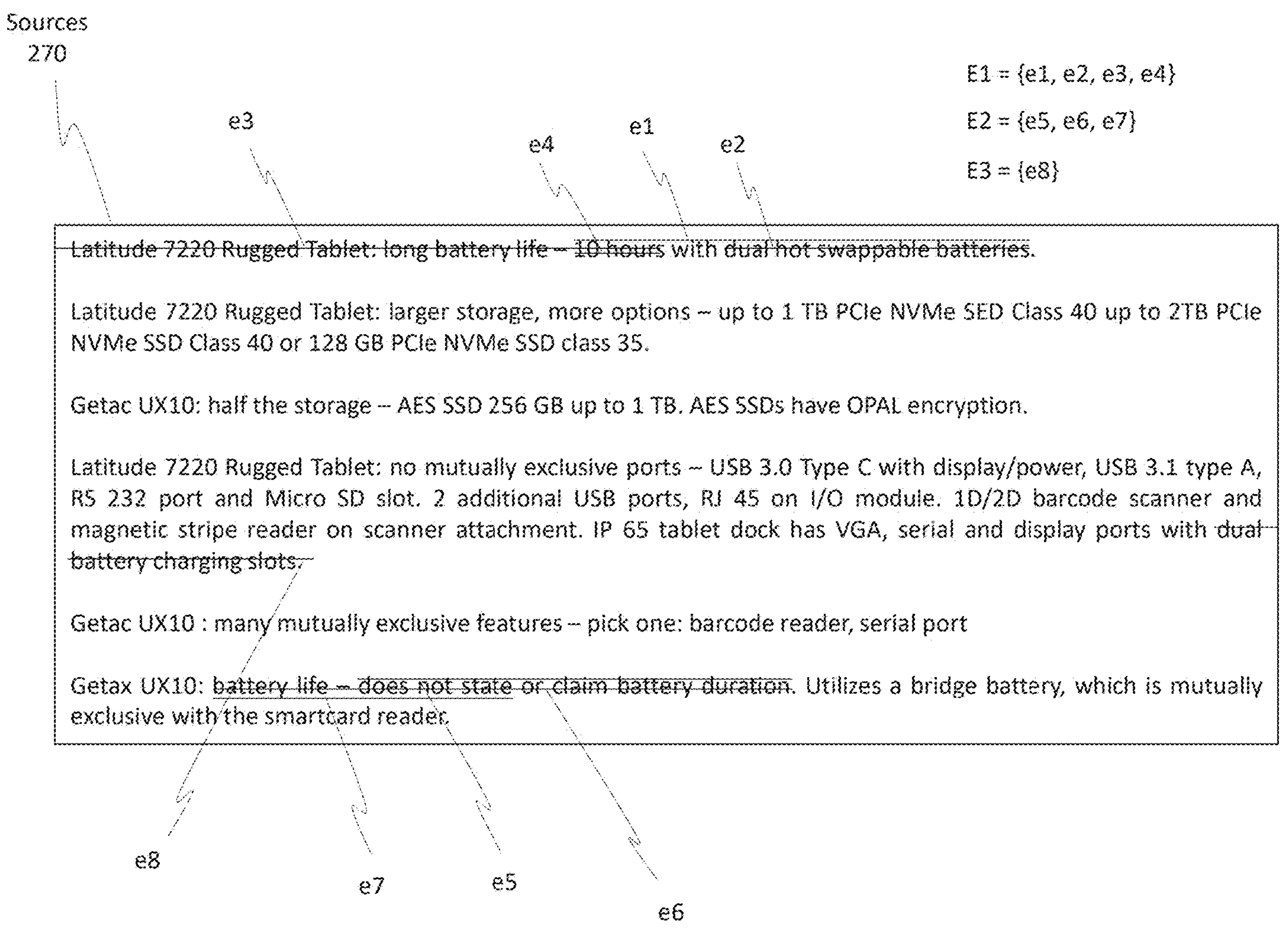

FIG. 2C shows a marked up version of the retrieved sources 270. In particular, FIG. 2C provides an illustration of the overlapping excerpt grouping and sorting algorithm behavior for a set of 8 excerpt inputs (e.g., inputs e1, e2, e3, e4, e5, e6, e7, and e8). The RPI generation module 220 receives the SQT and the set of merged excerpts (e.g., e1-e8 in FIG. 2C) and outputs a set of RPIs per merged excerpt. The text having the strikethrough illustration are included in the various excerpts, some of which overlap with each other. For instance, excerpt e3 overlaps with excerpts e1 and e4.

Architecture 200 in FIG. 2A also includes a review feedback loop (e.g., review 235). This loop involves the reference selection module 240, the element manual refinement module 245, and the element augmented refinement module 250.

Regarding the reference selection module 240, this module builds on top of the diverse set of excerpts and RPIs to facilitate the curation effort by allowing the reviewer (e.g., perhaps a human expert) to modify the triplet by selecting from available options. That is, the reviewer can modify the triplet via a multiple choice curation option in which multiple options are available for selection to modify the triplet by the reviewer.

The element manual refinement module 245 and the element augmented refinement module 250 are specialized refinement modules. Using these modules, the reviewer can perform free form curation of the triplet. Because the generative step is modularized, it allows partial regeneration when the reviewer performs free-form refinement. This reduces errors in the curation process and reduces human expert efforts.

Because excerpts contain less frivolous information, they are more compatible with traditional efficiency measurements, such as string similarity and n-grams. This means that efficient retrieval measurements can be performed without leveraging LLMs. By proceeding this way, the embodiments solve the problems discussed earlier.

However, the disclosed techniques can also be employed to mitigate systematic effects when relying on LLM-based evaluation. For instance, the embodiments can perform content generation verification. To do so, the embodiments proceed by comparing RPIs with the system output. As heuristically observed, if the RAG system employs TED for providing its answers, automatic evaluation results will be available with virtually no discrepancy with respect to manual assessment.

Figure 3:
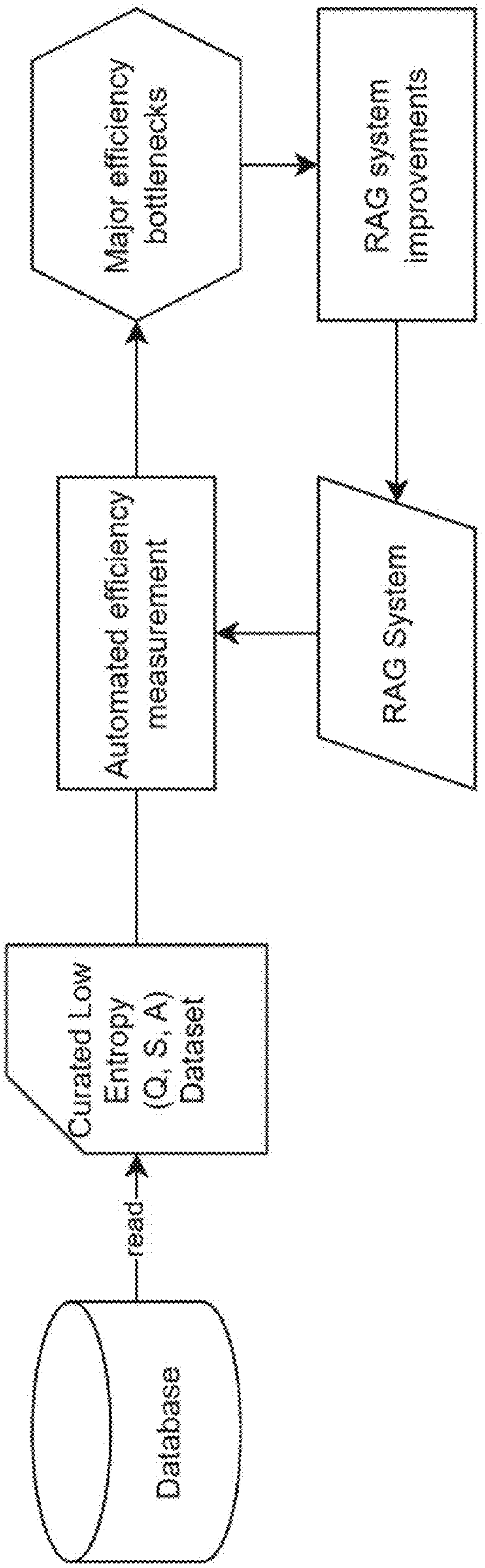
FIG. 3 illustrates a low entropy quality framework.

Attention will now be directed to FIG. 3, which illustrates a low entropy quality framework 300. Framework 300 provides efficient approach to work around LLM usage for automated alignment with human preferences and efficiency measurement of RAG systems by relying on the synthetic generation and curation of a low entropy question (Q), source(S), and answer dataset (A).

Figure 4:
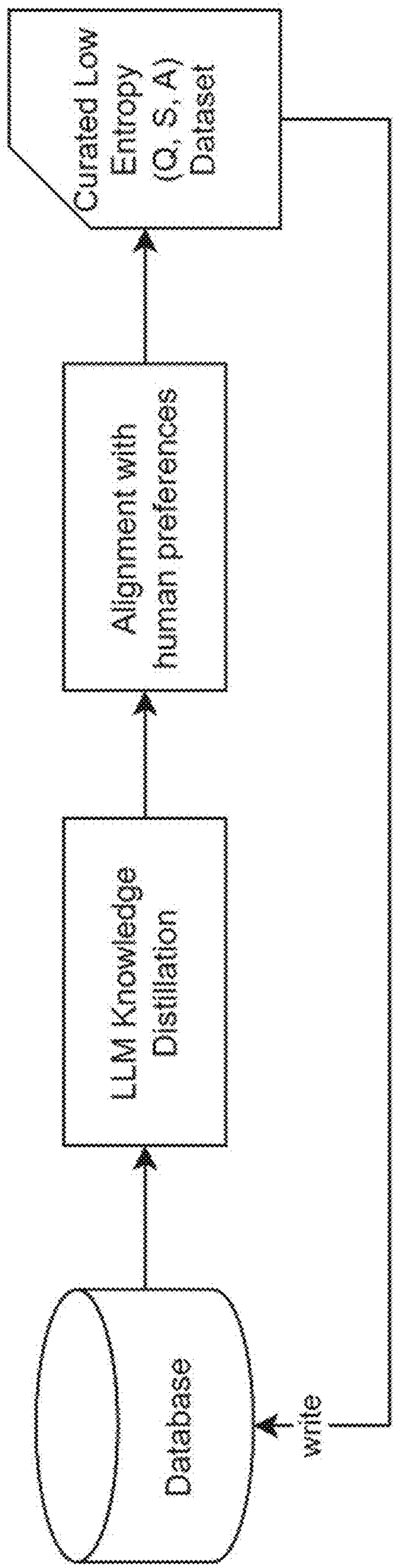
FIG. 4 illustrates a process for curating a low entropy dataset.

The generation and curation of low entropy datasets occur by feeding document passages in a dataset to an LLM to generate question/input and answer/output (Q&A) pairs, as shown in FIG. 4. That is, FIG. 4 shows an example process 400 to generate and curate low entropy Q&A datasets. These Q&A pairs have special properties that allow straightforward alignment with human preferences and efficient evaluation without relying on LLMs.

The curated low entropy dataset is a valuable resource. Its generation and curation occur on the following concepts that allow automated verification to occur efficiently without LLMs. One of the concepts includes the distillation of LLM knowledge onto Referenced Patterns of Information (RPIs). Another one of the concepts includes the introduction of squashing instructions (SQIs) to questions/inputs.

Figure 5:
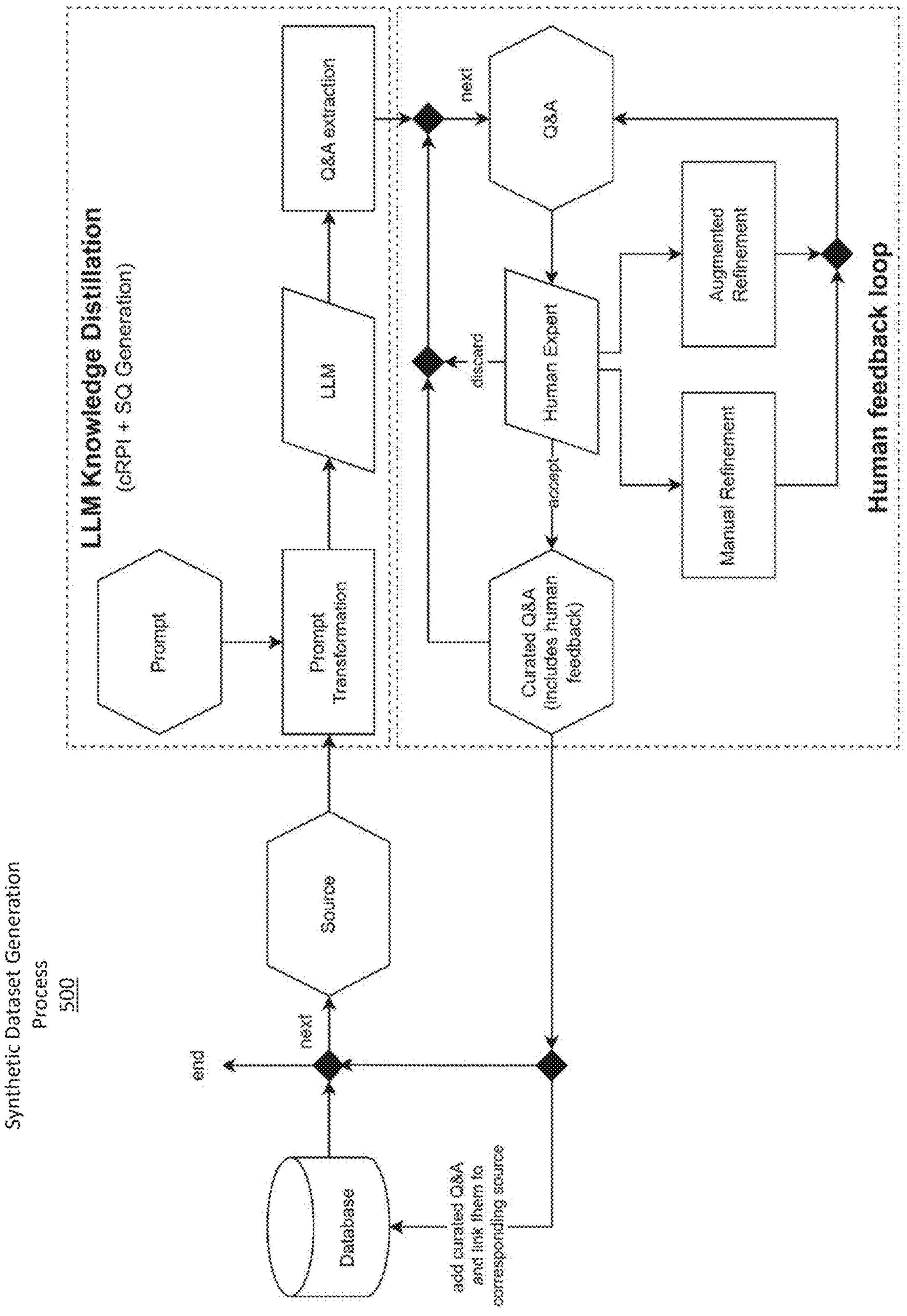
FIG. 5 illustrates a process for synthetically generating a dataset.

RPIs can be directly modified to collect human feedback, thereby avoiding LLM systematic behavior during automated evaluation while guiding the system towards human preferences. This means that human feedback can be collected once (e.g., during dataset generation) and with lower strains on users by benefitting of the LLM distillated knowledge. FIG. 5 shows a synthetic dataset generation process 500 for the low entropy quality framework.

The disclosed embodiments build on top of the synthetic dataset generation approach of the low entropy quality framework (FIG. 5) and enhances it with carefully designed decoding algorithms leveraging concepts (to be described next) to minimize human curation of synthetic dataset generation. The modified pipeline (FIG. 2A) provides more control of the automated initial triplet generation, ensuring the triplets respect relevant specifications. It also provides a rich set of options that allow the expert to introduce its preferences by selecting from such options instead of necessarily refining or discarding the triplet.

Autoregressive generation is the process of sampling outputs from a model and concatenating it to the previous input sequence to generate the next output. The process is continuous until some condition is matched, for instance a special value is output by the model (as an end of sequence) or an arbitrary number of tokens is generated. In Natural Language Processing (NLP) tasks, some decoding approaches are widely available.

One approach is a greedy decoding approach. Here, the sampling process chooses the most probable model output, i.e. by picking the argmax token of the log probabilities as estimated by the softmax layer of the LLM. This results in the generation of deterministic outputs and is a special case of multinomial decoding where temperature is set to 0.

Another approach is a beam search approach. Here, a decoding strategy can scan the output space only once, therefore being a computationally cheap decoding algorithm. However, the decoding problem is often represented as the challenge of maximizing the joint probability of the output sequence as predicted by the generative model. The optional length-T sequence in this setting is a Maximum Aposteriori Probability (MAP) inference on a T-order Markov chain with nodes composed of model output at each time step.

Beam search is a long-standing algorithm that performs such a search, where a set of B output sequences are kept.

At each time step, each beam is completed with all token extensions and only the most likely are kept for the next step. At the end of the process, B sequences and their rankings are made available, where typically the one with highest likelihood is returned.

With a diverse beam search, many alternatives to the beam search algorithm are available. The disclosed embodiments relate to the diverse beam search, which introduces heuristics in the search process to incorporate diversity across beam groups by using a dissimilarity function (in practice, typically hamming diversity is employed by computing the total number of shared equal tokens among groups). These heuristics are relevant to achieve diversity across beams while maintaining exploitation of small variations within the same group.

This property is relevant to facilitate human curation of automatically proposed triplets by selecting/discarding excerpts/RPIs from a set of diverse options. Additionally, the local exploitation of small variations also enhances the curator with a set of local variations of excerpts/RPIs. However, DBS by itself is typically not enough to ensure that the triplet respects the desired specifications.

Constrained Decoding

Various algorithms can be used to perform constrained decoding, each case applying modifications to decoding algorithms so that restrictions are satisfied. In many cases, the problem is cast on top of performing MAP inference on Markov chain requiring that some conditions are satisfied on the generated beams.

Guided Decoding

The disclosed embodiments relate to one particular type of constrained decoding where guide tools are employed. Certified deductive reasoning provide a way to employ dynamic constraint rules based on pre-defined conditions. Guided decoding builds upon completion engines. A completion engine allows the system to implement constraints upon common tools such as regular expressions (e.g., regexp).

That is, when active, the guide tool relies on regular expressions at each autoregressive step to determine whether a token is valid. When a violation is observed, the vocabulary is checked against current completion position to determine next valid tokens. The completion then continues by sampling from those valid tokens.

Trustworthy Extractive Decoding (TED)

TED framework contains two main modules: an excerpt filtering module and an auto-regressive generation module. The embodiments enhance these modules to properly address the challenges discussed earlier.

Auto-Regressive Generation

Figure 6:
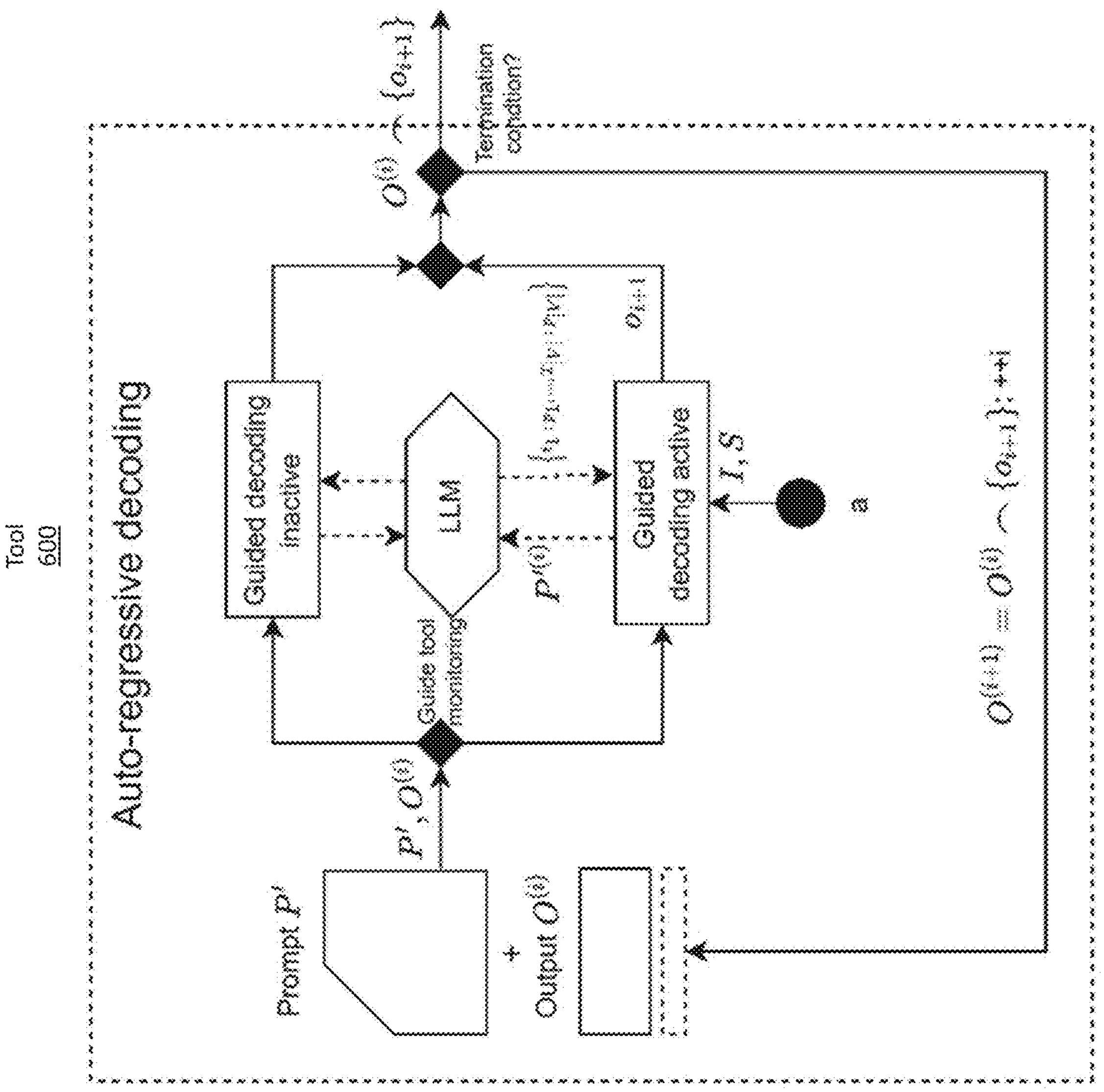
FIG. 6 illustrates an auto-regressive decoding tool.

Auto-regressive generation relies on a specially tailored guide tool 600, shown in FIG. 6. The guide tool monitors output state O (i), i.e. the output sequence up to step i. It modifies its operational state based on the generation of special delimiters. In some embodiments, the delimiters are:

$t_1$=[[to enable guided decoding (bottom path on FIG. 6).

$t_2$=]] to disable guided decoding (top path on FIG. 6).

When $t_1$ is observed and guide tool is inactive, it enters an active state and constrains auto-regressive generation to sample from a set of allowed paths specified by the completion engine. The guide tool specification of allowed paths builds upon pre-defined procedures. Then, the first step when the guide tool is enabled is to require the LLM to define which procedure is to be employed. The guide tool determines the possible procedures using the procedure selector, which is used to constrain auto-regressive generation.

As an example, suppose that proc1 and proc2 are available and [[has been generated. Then, the auto-regressive approach is constrained to generate [[proc1: or [[proc2: by ensuring that the LLM token logit probabilities are restricted only to tokens on these paths at each generative step i.

TED provides the following procedures. One procedure is an excerpt procedure. This procedure requires LLMs to follow paths of content available on provided sources. The exact algorithm is beyond the scope of this disclosure, but a regular expression is used to capture word-level atoms that are used to guide auto-regressive generation. Optionally, this procedure may require that each excerpt is unique and include a unique identifier. A unique identifier can be generated using external tools.

Another procedure is the cite_excerpt procedure. This procedure allows the decoding algorithm to follow paths available inside of a specific excerpt. In some scenarios, an LLM can be guided to generate excerpt fragments to compose a system answer to a user question.

The disclosed embodiments introduce new commands that replaces cite_excerpt for the generation of RPIs. The guide tool is also set to be always active and to ensure that RPIs are always captured. This approach is used jointly with diverse beam search to provide a set of diverse RPIs to facilitate curation.

By first filtering excerpts (e.g., using the excerpt filtering module 215) from the sources for Q&A tasks, it is possible to optionally reduce the complexity of the output generation task. Excerpt filtering is a fully extractive task on top of retrieved sources which can be enabled with lightweight fine-tuned models in a similar fashion to BERT for extractive summarization. Another path is to use TED with general-purpose LLMs for filtering excerpts without hallucinations.

Figure 7:
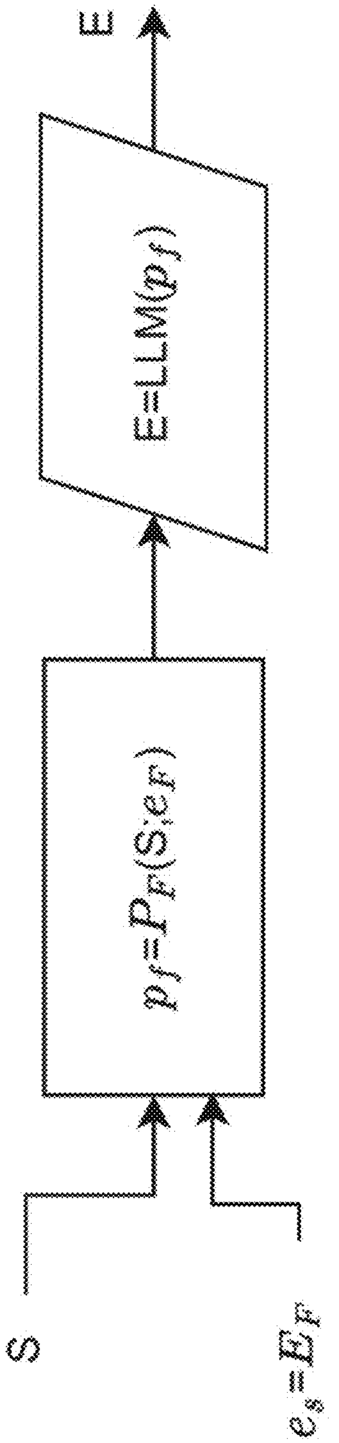
FIG. 7 illustrates a workflow.

Some embodiments build upon the latter approach, but any other approach capable of filtering excerpts from the sources suffices. FIG. 7 depicts the basic workflow 700 where a set of sources(S) and few shot examples(es) compose a filtering prompt (pr). A general-purpose LLM using TED decoding then generates A list of excerpts (E).

The disclosed excerpt filtering module and reference processing module together extend TED capabilities to generate a set of lists of excerpts $\{E_1, \ldots, E_n\}$ and then group excerpts to provide an initial excerpt list E' and a list of optional excerpts $E_{opt}$. By proceeding this way, the embodiments increase the likelihood that automatically generated excerpts are correct and, if not, additional options are used during curation to facilitate curation effort.

Synthetic Dataset Generation

The disclosed embodiments enhance low entropy quality framework by performing a number of operations. One operation involves modifying the triplet content from (SQT, RPI, Source) to (SQT, RPI, Excerpts). Another operation involves introducing carefully designed decoding algorithms in the synthetic dataset generation to remove inconsistencies on LLM knowledge distillation process. Yet another operation involves augmenting the initial triplet from a single option to a set of potential options provided in a ranked list which reduces curation efforts.

The first operation listed above improves the retrieval of automated verification by reducing frivolous information on the source and by encoding only the relevant excerpt. The latter two operations provide the means to reduce human curation, thereby allowing for more scalable dataset generation.

Referring back to FIG. 2A, the high-level triplet generation is depicted in FIG. 2A. Architecture 200 of FIG. 2A includes the generation of an initial triplet 230 which is then enhanced via a feedback process, as shown by review 235. Notably, the initial triplet generation avoids introducing as much inconsistencies as possible on triplets to reduce human interventions.

Now, the disclosure will discuss some of the various modules in more detail. For instance, the question generation module 210, the excerpt filtering module 215, the RPI generation module 220, and the reference processing module 225 will now be discussed in more detail.

Question Generation Module

Figure 8:
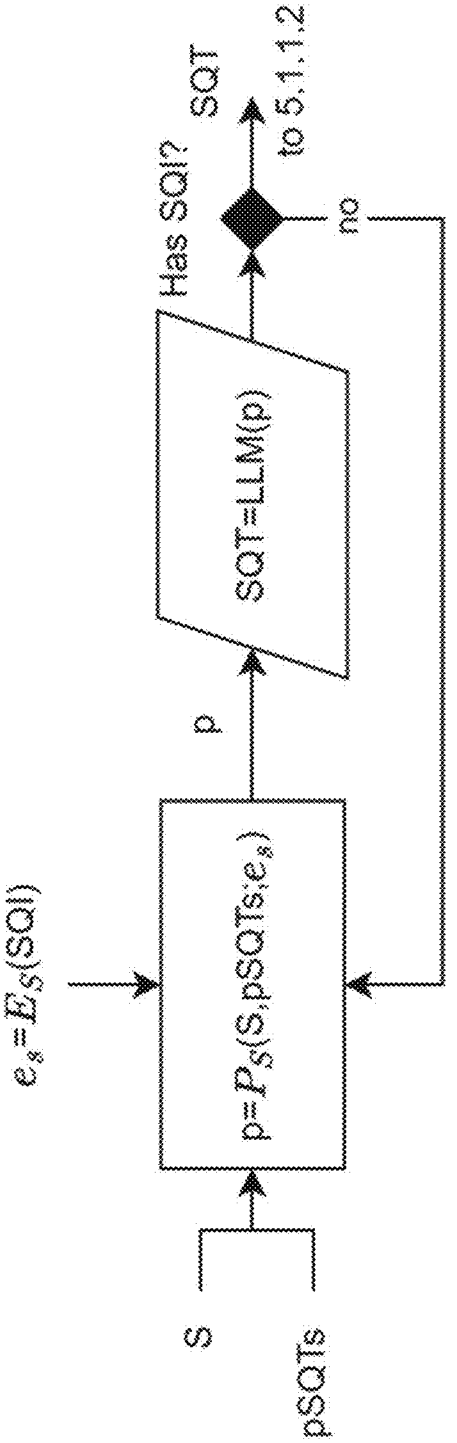
FIG. 8 illustrates a question generation module.

An SQT generation module 800 is shown in FIG. 8, and this module 800 corresponds to the question generation module 210 of FIG. 2A. SQT generation module 800 takes two major inputs: source(S) (e.g., source content 200B) and a list of previous questions (pSQTs). These are processed by an LLM using prompt P to generate another SQT that is unrelated to pSQTs. The embodiments do not enforce any particular requirement on this module, but it is noted that LLMs require some source of statistical pressure to successfully generate SQTs. This is achieved using few shot examples (E), which are enough for the process to work well in most cases. Few shot examples can be adjusted dynamically according to parameters. For instance, few shot examples can be provided to pressure LLMs to generate an SQT that requires a particular RPI class, such as positive or negative polarity when "Respond with a simple 'yes' or 'no'" SQI is employed. Additionally, since SQIs are static, ensuring that questions include SQIs can be ensured by simply applying a regular expression (regexp). If the question does not include an SQI, the process can be reprocessed using multinomial decoding or any other stochastic decoding algorithm until an SQT is generated. Such failures are very rare; thus a simple logic is enough.

Excerpt Filtering Module

Figure 9:
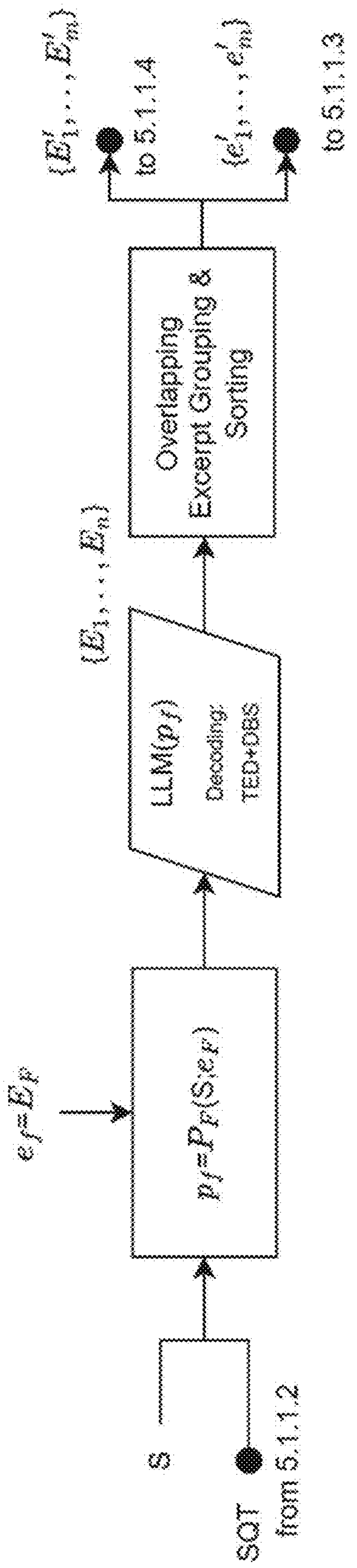
FIG. 9 illustrates an excerpt filtering module.

FIG. 9 shows an excerpt filtering module 900, and this module 900 corresponds to the excerpt filtering module 215 of FIG. 2A. Module 900 receives as input the set of sources S and the generated SQT. Module 900 also generates a set of excerpt groups $\{E_1, \ldots, E_n\}$ without enforcing any particular property.

Module 900 then outputs a set of excerpt groups $\{E'_1, \ldots, E'_n\}$ and the union of all excerpts within the group $\{e'_1, \ldots, e'_n\}$. Each excerpt group $E'_i$ contains an arbitrary number of continuously overlapping excerpt sequences, i.e.

$$e_a \cap e_b \neq \emptyset \, \forall e_a, e_b \in E'_i, a \neq b$$

This behavior provides a set of diverse excerpts that results in beneficial capabilities to facilitate curation. For instance, the output contains a rich set of excerpt groups, which can be curated by selecting the correct excerpts from the set. The output also contains multiple different groups, which allows the curation to discard or select similar excerpt groups without having to analyze all excerpts individually. Each group contains variations of possible excerpts such that the user can fine-tune the excerpt from the available options. The groups and group members are sorted accordingly to model likelihood such that, if the model is strong, it reduces the need of going through the whole set.

Recall, from the earlier description, there are various ways of retrieving excerpts. The embodiments extend those methods to generate a set of diverse excerpt groups. To this end, the embodiments consider an implementation based on using diverse beam search (DBS) and TED Excerpt Filtering Module. Similarly to SQT Generation Module, a general purpose LLM receives a prompt pf built upon the source S and the priorly generated SQT. Then auto-regressive decoding employs DBS with each beam decoded using TED Excerpt Filtering Module instead of greedy approach. This results in a set of diverse groups of beams, each beam containing a group of excerpts. Thus, this approach provides the unconstrained excerpt set $\{E_1, \ldots, E_n\}$.

This disclosure will now describe an embodiment to group and sort excerpts. It is feasible to exploit DBS beam group structure to optimize the algorithm, but this would make the description more convoluted, and its execution time is expected to be negligible compared to inference time. In such cases, one can simply span the beam groups onto a plain set of excerpts $\{e_1, \ldots, e_m\}$ and create groups of non-overlapping excerpts. The average token logits allow to sort overlapping excerpt groups according to the likelihood of the model to generate them. Logits are computed only on excerpt retrieved content, ignoring the likelihood of other formatting tokens. Groups containing more excerpts accumulate higher logits scores. Some embodiments omit group element sorting, but it is straightforward to arrange each excerpt based on their logits.

RPI Generation Module

Figure 10:
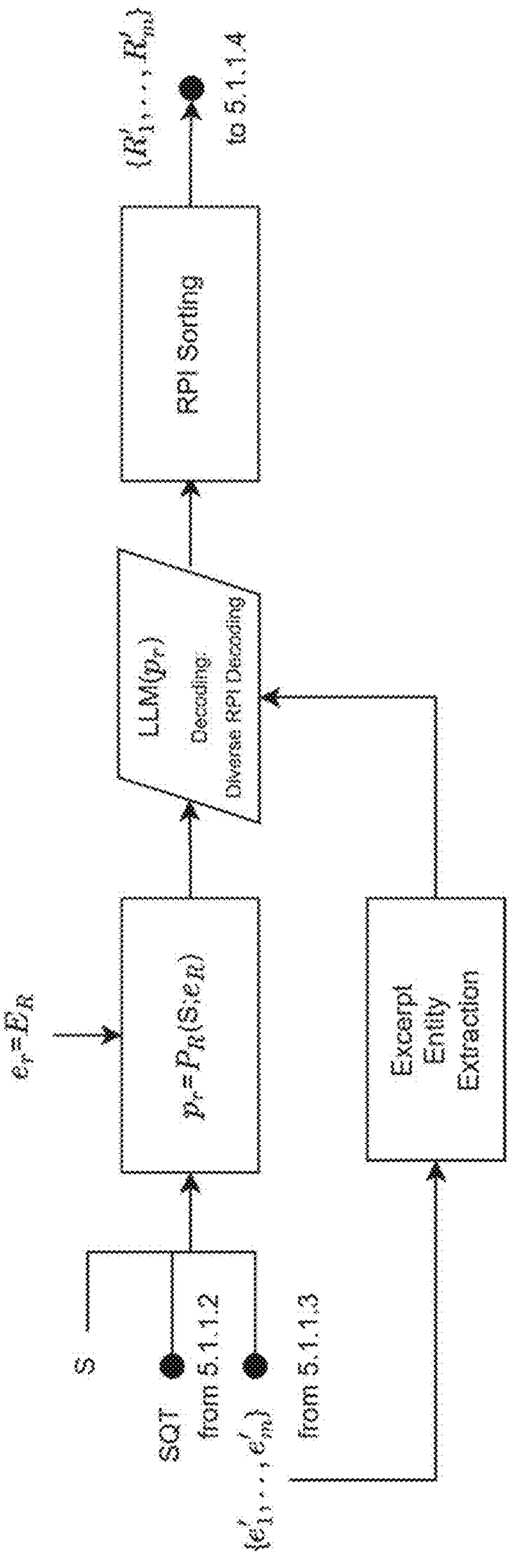
FIG. 10 illustrates an RPI generation module.

An RPI generation module 1000 is shown in FIG. 10, and this module 1000 corresponds to RPI generation module 220 of FIG. 2A. Module 1000 receives an SQT and the set of merged excerpts $\{e'_1, \ldots, e'_n\}$ and outputs a set of RPIs per merged excerpt $\{R_1, \ldots, R_n\}$.

The prompt p_r comprises all merged excerpts such that the generative process can span over the largest set of possible RPIs. It is noted that this set is then sorted accordingly to LLM likelihood on the final step, which ensures that curation can benefit of diverse set of possibilities for simpler curation while benefiting on distillated LLM knowledge. This results in similar benefits as priorly exposed for the excerpt filtering module but for the curation of RPIs.

During the generative process, the embodiments ensure that the generated beams capture all RPIs in the process. Since RPIs are designed to result in a low entropy distribution with limited support, it is possible to design procedures that ensure that generated beams comply with SQI requirements. Constraining generated beams to contain polarity information (i.e. respond with a simple yes or no, or its variation requiring an explanation) can be achieved by using a regular expression. This also applies to any other categorical SQI.

Achieving this behavior to extract SQIs (e.g., such as "respond with a minimal excerpt") involves a more carefully designed approach. It is noted that: (i) all extractive RPIs are contained within excerpts; (ii) not all excerpt content is an RPI; and (iii) some segments of the excerpts may be required to construct a valid beam even if they are not an excerpt. It is further noted that these segments behave to support the generation task. This document refers to these as support segments.

In some examples, first, there is a set of commonly used words available on excerpts that can be used while composing an output that does imply a violation of the goal of capturing all RPIs on the outputs. To reduce the complexity of the generative task on top of this observation, it is possible to create a bag of forbitten words F from the excerpts by focusing on its relevant entities. This can be achieved by employing Named Entity Recognition (NER) algorithms or, in a simpler approach, by removing stop words.

Then, the embodiments modify the TED auto-regressive generation module In particularly, instead of simply using cite_excerpt, TED is enhanced so that it can differentiate the role of the excerpt segment. The embodiments also introduce two procedures, both using the same logic as previously described to cite_excerpt, but allowing the LLM to classify how it is employing the segment within the beam. For example, with a support procedure, this segment is not an RPI but the LLM has decided to compose a beam with content from the excerpt. Since supports are discarded, they are not required to determine the excerpt ID they are referring to. As another example, with a reference procedure, the embodiments label that the segment is an RPI.

These procedures replace the cite_excerpt procedure. Note that the procedure names and format can be optimized.

A guide tool is set to be always active, ensuring that no excerpt forbitten word is generated. Instead of using unconstrained decoding when neither support nor reference procedures are operating, the embodiments guide tool limit beams from generating forbitten words without using such procedures.

By coupling this modified TED version with DBS (Diverse RPI Decoding algorithm), one can generate diverse RPI sets by capturing the content within reference procedures and disregarding the content of support procedures. Since the guide tool constrains beams from generating excerpt forbitten words, this approach avoids beams that do not capture important RPIs.

Similarly to cite_excerpt, reference procedure determines the exact excerpt ID that it refers to. Hence, it is simple to group RPIs per excerpt ID and then sort then accordingly to model per-token likelihood.

Reference Processing Module

Figure 11:
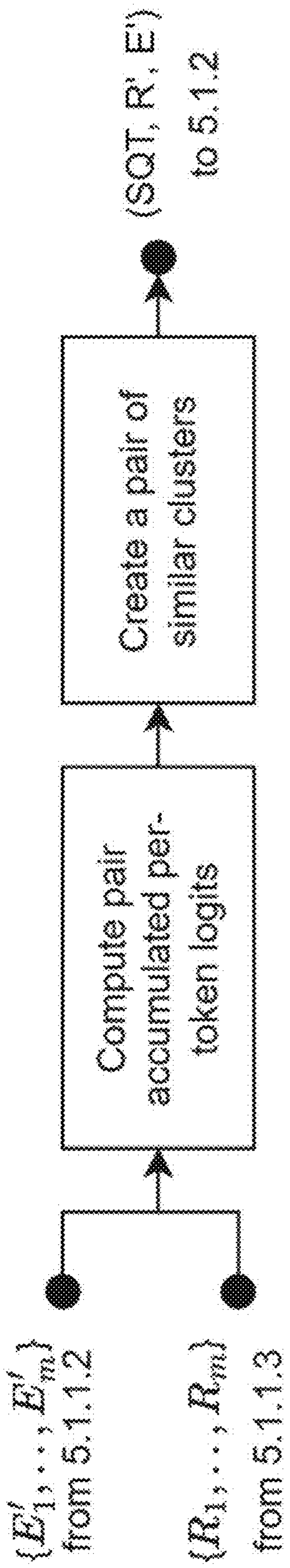
FIG. 11 illustrates a reference processing module.

FIG. 11 shows a reference processing module 1100, where this module 1100 corresponds to the reference processing module 225 of FIG. 2A. The reference processing module 1100 has a goal to select the most likely set of excerpts and RPIs to compose the reference (SQT, R', E') triplet. This disclosure describes one embodiment that achieves such behavior by noting that RPI groups are paired with excerpt groups. Thus, one can simply accumulate the per-token logits of each R', E' and use such values to split references into two clusters: reference, support. This can be achieved with a clustering algorithm or through heuristics. A dendrogram approach can be employed for the first case and a potential heuristic can compute a threshold based on a fraction of the top group total logit. This can even be experimented by the human expert such that it can select one approach that better reflects its preferences. It is noted that the remaining excerpts and RPIs that do not compose the reference triplet are provided to the human expert to facilitate curation effort.

Review Feedback Loop

The reviewing expert receives the reference (SQT, R', E') triplet from the initial triplet generation module. It can perform a set of actions on top of this triplet.

One action is an accept action, where the reference triplet is stored in the database and the initial triplet generation process is then repeated to generate another SQT for this source if more SQTs are requested or another source is sampled to continue the process until the pool is finished. Another action is a discard action, where the reference triplet is discarded and the process continues as previously described for the accept action.

Another action is a multiple-choice curation action, where the expert may opt to apply modifications by selecting/discarding excerpt/RPI groups and by modifying excerpt/RPI elements by selecting other options from within the group. Another action is a free-form curation. This curation includes an element manual refinement, where the expert may opt to manually modify each element of the reference triplet to incorporate particular preferences. The curation also include an augmented refinement action, where the expert may interact with an LLM/agent to perform more complex refinements by specifying a required behavior. This can be achieved with carefully designed prompts or agentic tools. Albeit this disclosure foresees this capability, the embodiments do not require any particular behavior except.

With the partial regeneration module, after refinement, the expert may request to execute a partial workflow of the triplet generation module. For instance, if the SQT has been modified, it may be useful to regenerate excerpts and RPIs. If excerpts have been modified, it may be useful to regenerate only RPIs. One can also generate excerpts for new RPIs with an algorithm similar to those previously described with respect to the excerpt filtering module, but only accepting as valid beams those which contain RPIs.

With the automated verification process, there is a retrieval verification. Here, the availability of excerpts allows to mitigate problems of former approaches, including the low entropy quality framework. Since excerpt contains lower presence of frivolous information and are much shorter (lower dimensional) than sources, one can benefit of classical NLP similarity measures, such as: string similarity, Longest Common Sequence (LCS), n-grams on non-stop words, word stemming etc. It can also be employed with embedding similarity measures or LLMs where it can yield more precise measurements for the same reason.

Regarding output verification, SQTs and RPIs can be efficiently employed to provide automated measurements matching human evaluations. For extractive SQIs, TED ensures that automated evaluation matches human evaluations.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
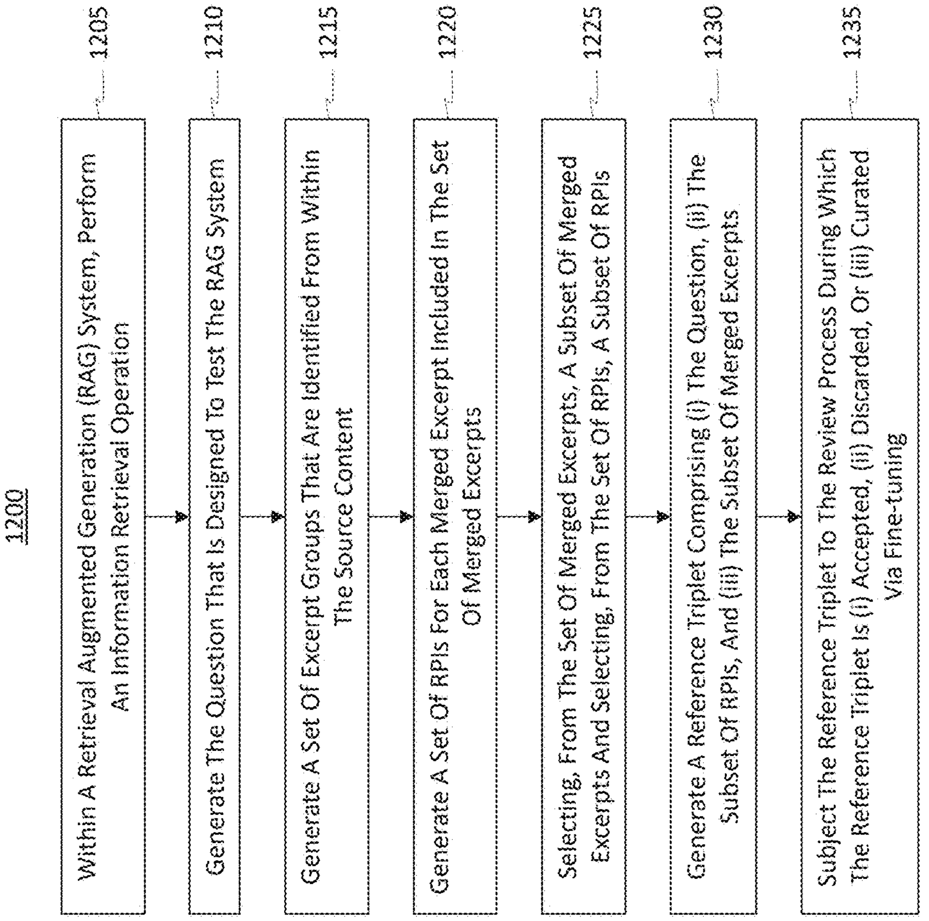
FIG. 12 illustrates a flowchart of an example method for testing a RAG system.

Attention will now be directed to FIG. 12, which illustrates a flowchart of an example method 1200 for providing a trustworthy framework for quality assessment and alignment of generative processes for an LLM. Method 1200 can be implemented with architecture 200 of FIG. 2A. Also, method 1200 can be facilitated by service 255 of FIG. 2A.

Within a retrieval augmented generation (RAG) system, act 1205 includes performing an information retrieval operation. This operation includes: (i) accessing a database that is selected to provide source content usable to generate a question designed to test the RAG system and (ii) obtaining the source content.

The embodiments receive, at a question generation module, the source content and a list of previous questions. The question generation module is tasked with generating (act 1210) the question that is designed to test the RAG system. In some embodiments, a large language model (LLM) processes the source content and the list of previous questions to generate the question. The question is generated by the LLM in a manner such that the question is designed to be unrelated to the previous questions included in the list of previous questions.

The embodiments receive, at an excerpt filtering module, the source content and the question generated by the question generation module. The excerpt filtering module is tasked with generating (act 1215) a set of excerpt groups that are identified from within the source content. Each excerpt group in the set includes variations of possible excerpts that are fine-tunable during a review process. The excerpt groups in the set are merged together to form a set of merged excerpts.

The embodiments receive, at a referenced pattern of information (RPI) generation module, the question and the set of merged excerpts. The RPI generation module is tasked with generating (act 1220) a set of RPIs for each merged excerpt included in the set of merged excerpts.

The embodiments receive, at a reference processing module, the set of RPIs and the set of merged excerpts. The reference processing module is tasked with selecting (act 1225), from the set of merged excerpts, a subset of merged excerpts and selecting, from the set of RPIs, a subset of RPIs. The subset of merged excerpts and the subset of RPIs are used to generate (act 1230) a reference triplet comprising (i) the question, (ii) the subset of RPIs, and (iii) the subset of merged excerpts.

Act 1235 includes subjecting the reference triplet to the review process during which the reference triplet is (i) accepted, (ii) discarded, or (iii) curated via fine-tuning. When the reference triplet is accepted, the reference triplet is stored in a database and a new triplet is generated for the source content. Optionally, when the reference triplet is curated, this curating may be performed via multiple choice curation. In another scenario, when the reference triple is curated, this curating may be performed via free-form curation.

In some implementations, the set of merged excerpts are sorted based on a large language model (LLM) type. Optionally, the set of excerpt groups includes an arbitrary number of continuously overlapping excerpt sequences.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, classifiers, and component are examples of terms that may refer to software objects or routines that execute on the computing system. The different components, modules, engines, services, and classifiers described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 13:
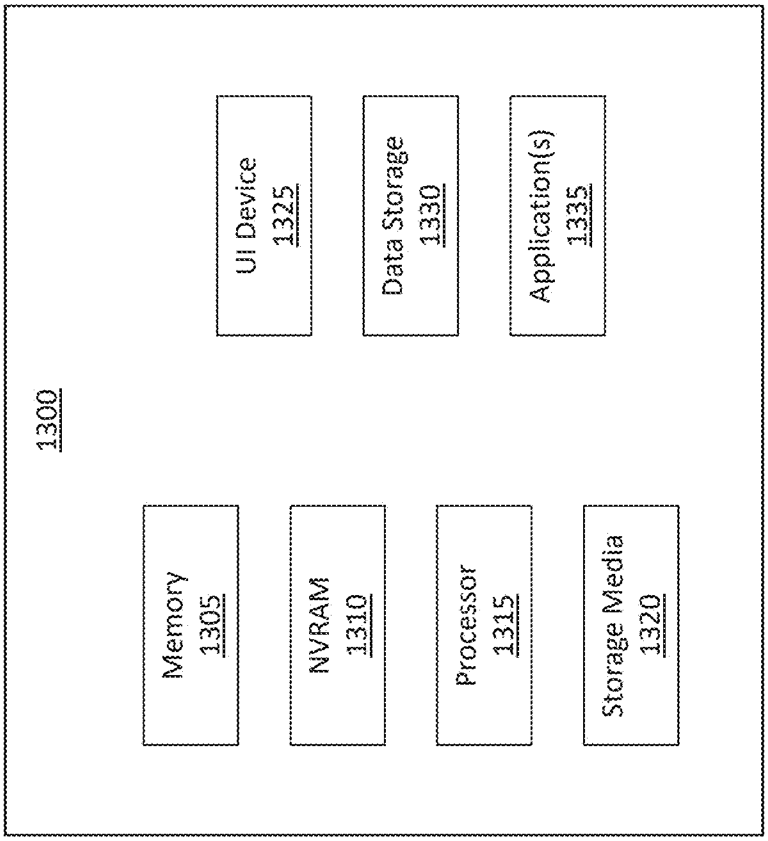
FIG. 13 illustrates an example computer system that can be configured to perform any of the disclosed operations.

With reference briefly now to FIG. 13, any one or more of the entities disclosed, or implied, by the Figures and/or elsewhere herein, may take the form of, or include, or be implemented on, or hosted by, a physical computing device, one example of which is denoted at 1300. This example device can be implemented in architecture 200 of FIG. 2A and can host service 255. Also, where any of the aforementioned elements comprise or consist of a virtual machine (VM), that VM may constitute a virtualization of any combination of the physical components disclosed in FIG. 13.

In the example of FIG. 13, the physical computing device 1300 includes a memory 1305 which may include one, some, or all, of random access memory (RAM), non-volatile memory (NVM) 1310 such as NVRAM for example, read-only memory (ROM), and persistent memory, one or more hardware processors 1315, non-transitory storage media 1320, UI device 1325, and data storage 1330. One or more of the memory 1305 of the physical computing device 1300 may take the form of solid-state device (SSD) storage. Also, one or more applications 1335 may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 1300 may also be representative of an edge system, a cloud-based system, a datacenter or portion thereof, or other system or entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. It should also be noted how any feature recited herein can be combined with any other feature recited herein.

What is claimed is:

1. A method comprising:

within a retrieval augmented generation (RAG) system, performing an information retrieval operation by: (i) accessing a database that is selected to provide source content usable to generate a question designed to test the RAG system and (ii) obtaining the source content;

receiving, at a question generation module, the source content and a list of previous questions, wherein the question generation module is tasked with generating the question that is designed to test the RAG system;

receiving, at an excerpt filtering module, the source content and the question generated by the question generation module, wherein the excerpt filtering module is tasked with generating a set of excerpt groups that are identified from within the source content, wherein each excerpt group in the set includes variations of possible excerpts that are fine-tunable during a review process, wherein the each excerpt group comprises excerpt sequences that continuously overlap in textual content such that each excerpt sequence shares at least a portion of text with another excerpt sequence within a same excerpt group, and wherein the excerpt groups are generated by applying a decoding process that enforces extractive constraints on the source content, and wherein the excerpt groups in the set are merged together to form a set of merged excerpts;

receiving, at a referenced pattern of information (RPI) generation module, the question and the set of merged excerpts, wherein the RPI generation module is tasked with generating a set of RPIs for each merged excerpt included in the set of merged excerpts by constraining generation to content derived from the set of merged excerpts and labeling generated segments as RPIs corresponding to specific excerpts;

receiving, at a reference processing module, the set of RPIs and the set of merged excerpts, wherein the reference processing module is tasked with selecting, from the set of merged excerpts, a subset of merged excerpts and selecting, from the set of RPIs, a subset of RPIs, wherein the selecting is based on likelihood scores derived from probability outputs of a large language model corresponding to the set of RPIs and the set of merged excerpts, wherein a reference triplet is generated using the subset of merged excerpts and the subset of RPIs, and wherein the reference triplet includes: (i) the question, (ii) the subset of RPIs, and (iii) the subset of merged excerpts; and subjecting the reference triplet to the review process during which the reference triplet is (i) accepted, (ii) discarded, or (iii) curated via fine-tuning, wherein, in response to a modification of the set of merged excerpts during the review process, the RPI generation module is automatically re-invoked to implement partial regeneration by regenerating only RPIs that correspond to those merged excerpts that were modified while preserving at least some previously generated RPIs associated with unmodified merged excerpts.

2. The method of claim 1, wherein a large language model (LLM) processes the source content and the list of previous questions to generate the question, and wherein the question is generated by the LLM in a manner such that the question is designed to be unrelated to the previous questions included in the list of previous questions.

3. The method of claim 1, wherein, when the reference triplet is accepted, the reference triplet is stored in a database and a new triplet is generated for the source content.

4. The method of claim 1, wherein, when the reference triplet is curated, said curating is performed via multiple choice curation.

5. The method of claim 1, wherein, when the reference triplet is curated, said curating is performed via free-form curation.

6. The method of claim 1, wherein the set of merged excerpts are sorted based on a large language model (LLM) type.

7. The method of claim 1, wherein the set of excerpt groups includes an arbitrary number of continuously overlapping excerpt sequences.

8. A computer system comprising:

one or more processors; and one or more hardware storage devices that store instructions that are executable by the one or more processors to cause the computer system to:

within a retrieval augmented generation (RAG) system, perform an information retrieval operation by: (i) accessing a database that is selected to provide source content usable to generate a question designed to test the RAG system and (ii) obtaining the source content;

receive, at a question generation module, the source content and a list of previous questions, wherein the question generation module is tasked with generating the question that is designed to test the RAG system;

receive, at an excerpt filtering module, the source content and the question generated by the question generation module, wherein the excerpt filtering module is tasked with generating a set of excerpt groups that are identified from within the source content, wherein each excerpt group in the set includes variations of possible excerpts that are fine-tunable during a review process, wherein the each excerpt group comprises excerpt sequences that continuously overlap in textual content such that each excerpt sequence shares at least a portion of text with another excerpt sequence within a same excerpt group, and wherein the excerpt groups are generated by applying a decoding process that enforces extractive constraints on the source content, and wherein the excerpt groups in the set are merged together to form a set of merged excerpts;

receive, at a referenced pattern of information (RPI) generation module, the question and the set of merged excerpts, wherein the RPI generation module is tasked with generating a set of RPIs for each merged excerpt included in the set of merged excerpts by constraining generation to content derived from the set of merged excerpts and labeling generated segments as RPIs corresponding to specific excerpts;

receive, at a reference processing module, the set of RPIs and the set of merged excerpts, wherein the reference processing module is tasked with selecting, from the set of merged excerpts, a subset of merged excerpts and selecting, from the set of RPIs, a subset of RPIs, wherein the selecting is based on likelihood scores derived from probability outputs of a large language model corresponding to the set of RPIs and the set of merged excerpts, wherein a reference triplet is generated using the subset of merged excerpts and the subset of RPIs, and wherein the reference triplet includes: (i) the question, (ii) the subset of RPIs, and (iii) the subset of merged excerpts; and subject the reference triplet to the review process during which the reference triplet is (i) accepted, (ii) discarded, or (iii) curated via fine-tuning, wherein, in response to a modification of the set of merged excerpts during the review process, the RPI generation module is automatically re-invoked to implement partial regeneration by regenerating only RPIs that correspond to those merged excerpts that were modified while preserving at least some previously generated RPIs associated with unmodified merged excerpts.

9. The computer system of claim 8, wherein, when the reference triplet is accepted, the reference triplet is stored in a database and a new triplet is generated for the source content.

10. The computer system of claim 8, wherein the reference triplet is discarded.

11. The computer system of claim 8, wherein, when the reference triplet is curated, said curating is performed via multiple choice curation.

12. The computer system of claim 8, wherein, when the reference triplet is curated, said curating is performed via free-form curation.

13. The computer system of claim 8, wherein the set of merged excerpts are sorted based on a large language model (LLM) type.

14. The computer system of claim 8, wherein the set of excerpt groups includes an arbitrary number of continuously overlapping excerpt sequences.

15. One or more hardware storage devices that store instructions that are executable by one or more processors to cause the one or more processors to:

within a retrieval augmented generation (RAG) system, perform an information retrieval operation by: (i) accessing a database that is selected to provide source content usable to generate a question designed to test the RAG system and (ii) obtaining the source content;

receive, at a question generation module, the source content and a list of previous questions, wherein the question generation module is tasked with generating the question that is designed to test the RAG system;

receive, at an excerpt filtering module, the source content and the question generated by the question generation module, wherein the excerpt filtering module is tasked with generating a set of excerpt groups that are identified from within the source content, wherein each excerpt group in the set includes variations of possible excerpts that are fine-tunable during a review process, wherein the each excerpt group comprises excerpt sequences that continuously overlap in textual content such that each excerpt sequence shares at least a portion of text with another excerpt sequence within a same excerpt group, and wherein the excerpt groups are generated by applying a decoding process that enforces extractive constraints on the source content, and wherein the excerpt groups in the set are merged together to form a set of merged excerpts;

receive, at a referenced pattern of information (RPI) generation module, the question and the set of merged excerpts, wherein the RPI generation module is tasked with generating a set of RPIs for each merged excerpt included in the set of merged excerpts by constraining generation to content derived from the set of merged excerpts and labeling generated segments as RPIs corresponding to specific excerpts;

receive, at a reference processing module, the set of RPIs and the set of merged excerpts, wherein the reference processing module is tasked with selecting, from the set of merged excerpts, a subset of merged excerpts and selecting, from the set of RPIs, a subset of RPIs, wherein the selecting is based on likelihood scores derived from probability outputs of a large language model corresponding to the set of RPIs and the set of merged excerpts, wherein a reference triplet is generated using the subset of merged excerpts and the subset of RPIs, and wherein the reference triplet includes: (i) the question, (ii) the subset of RPIs, and (iii) the subset of merged excerpts; and subject the reference triplet to the review process during which the reference triplet is (i) accepted, (ii) discarded, or (iii) curated via fine-tuning, wherein, in response to a modification of the set of merged excerpts during the review process, the RPI generation module is automatically re-invoked to implement partial regeneration by regenerating only RPIs that correspond to those merged excerpts that were modified while preserving at least some previously generated RPIs associated with unmodified merged excerpts.

16. The one or more hardware storage devices of claim 15, wherein, when the reference triplet is accepted, the reference triplet is stored in a database and a new triplet is generated for the source content.

17. The one or more hardware storage devices of claim 15, wherein the reference triplet is discarded.

18. The one or more hardware storage devices of claim 15, wherein, when the reference triplet is curated, said curating is performed via multiple choice curation.

19. The one or more hardware storage devices of claim 15, wherein, when the reference triplet is curated, said curating is performed via free-form curation.

20. The one or more hardware storage devices of claim 15, wherein the set of merged excerpts are sorted based on a large language model (LLM) type.

* * * * *